United States Patent
Chung et al.

(10) Patent No.: US 7,982,995 B2
(45) Date of Patent: Jul. 19, 2011

(54) METHOD OF WRITING DATA USING COERCIVITY DISTRIBUTION OF DATA STORAGE MEDIUM

(75) Inventors: Woo-seong Chung, Gyeongsangnam-do (KR); Sang-hyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 11/830,160

(22) Filed: Jul. 30, 2007

(65) Prior Publication Data

US 2008/0043359 A1    Feb. 21, 2008

(30) Foreign Application Priority Data

Aug. 17, 2006  (KR) .................. 10-2006-0077811

(51) Int. Cl.
*G11B 5/02* (2006.01)
(52) U.S. Cl. ............................. 360/59; 360/31
(58) Field of Classification Search .............. None
See application file for complete search history.

(56) References Cited

U.S. PATENT DOCUMENTS

| | | | | |
|---|---|---|---|---|
| 5,240,784 A * | 8/1993 | Matsumoto | ................ | 428/820.6 |
| 6,392,832 B1 * | 5/2002 | Oshiki et al. | .................... | 360/59 |
| 6,405,277 B1 * | 6/2002 | Jen et al. | ............................ | 711/4 |
| 6,493,164 B1 * | 12/2002 | Kikitsu et al. | .................. | 360/59 |
| 6,954,320 B2 * | 10/2005 | Yang | ............................... | 360/46 |
| 6,972,920 B2 * | 12/2005 | Kim et al. | ........................ | 360/75 |
| 6,999,256 B2 * | 2/2006 | Kim et al. | ........................ | 360/31 |
| 7,095,577 B1 * | 8/2006 | Codilian et al. | ................ | 360/46 |
| 7,102,838 B2 * | 9/2006 | Kim et al. | ........................ | 360/31 |
| 2002/0105748 A1 * | 8/2002 | Lamberts | ........................ | 360/69 |
| 2003/0112541 A1 * | 6/2003 | Lee et al. | ........................ | 360/55 |
| 2006/0072229 A1 * | 4/2006 | Yun et al. | ........................ | 360/31 |

FOREIGN PATENT DOCUMENTS

| | | |
|---|---|---|
| JP | 2004-95010 | 3/2004 |
| JP | 2004-185735 | 7/2004 |
| KR | 2004-52030 | 6/2004 |

\* cited by examiner

*Primary Examiner* — Dismery E Mercedes
(74) *Attorney, Agent, or Firm* — Stanzione & Kim, LLP (57) ABSTRACT

A method of writing data using a coercivity distribution of a data storage medium, including mapping the coercivity distribution of the data storage medium including a plurality of write spots in which data can be written, measuring a current ambient temperature, and if the ambient temperature is higher than a room temperature, selecting a write spot having a relatively large coercivity to receive write data, and if the ambient temperature is lower than the room temperature, selecting a write spot having a relatively small coercivity to receive the write data.

25 Claims, 7 Drawing Sheets

FIG. 7

METHOD OF WRITING DATA USING COERCIVITY DISTRIBUTION OF DATA STORAGE MEDIUM

CROSS-REFERENCE TO RELATED APPLICATIONS

This application claims priority under 35 U.S.C. §119(a) from Korean Patent Application No. 10-2006-0077811, filed on Aug. 17, 2006, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a method of writing data using a coercivity distribution of a data storage medium to the data storage medium.

2. Description of the Related Art

Hard disk drives are data storage devices adopted in computers, MP3 players, mobile phones, etc. In general, data is written to concentric tracks formed on disk surfaces of data storage medium loaded into hard disk drives. The data storage medium (disks) are installed at spindle motors to rotate at high speeds, and data is read or written by magnetic heads.

The disks are the data storage medium of the hard disk drives and include magnetic layers storing data using magnetic anisotropic characteristics. Coercivity of the disks, i.e., coercivity of the magnetic layers, are closely related to the reliability of data written to the disks. Coercivity means a strength of a magnetic field in which an inverse magnetic field is applied to a magnetized magnetic body, and thus magnetization of the magnetic body is "0." If a strength of the coercivity of the disks is large, a strong write magnetic field is required to write the data to the disks, but the preservation of the data is improved. If a strength of the coercivity of the disks is small, a weak write magnetic field is required to write the data to the disks, but the preservation of the data is deteriorated.

A strength of coercivity varies with temperature. As the temperature drops by 1° C., a strength Hc of coercivity of a disk is increased by 15 to 16 Oersteds (Oe). If the temperature rises, the strength Hc of the coercivity of the disk is decreased. Thus, if a write magnetic field optimized to write data at a room temperature is applied to write data to a disk having a temperature lower than the room temperature, the data is not written to the disk at a recognizable strength, i.e., weak write occurs. Also, if the write magnetic field optimized to write the data at the room temperature is applied to write data to a disk having a temperature higher than the room temperature, data is written to several tracks including an adjacent track, in which previously written data becomes erased. Thus, pre-written data is erased, i.e., adjacent track write (ATW) and adjacent track erase (ATE) occur. Such weak write and ATW (or ATE) increases a bit error rate (BER) and channel statistic measurement (CSM), and thus a data processing performance of a hard disk drive is deteriorated.

SUMMARY OF THE INVENTION

The present general inventive concept provides a method of writing data using a coercivity distribution of a data storage medium by which the reliability of writing of data is not deteriorated as a result of a variation in a temperature.

The present general inventive concept also provides a method of writing data using a coercivity distribution of a data storage medium so as to maintain the reliability of writing of data without varying a magnetic field of a magnetic head as a result of a variation in a temperature.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of writing data using a coercivity distribution of a data storage medium, including mapping the coercivity distribution of the data storage medium including a plurality of write spots to which data can be written, measuring a current ambient temperature, and if the ambient temperature is higher than a room temperature, selecting one of the plurality of write spots having a relatively large coercivity to receive write data, and if the ambient temperature is lower than the room temperature, selecting another of the plurality of write spots having a relatively small coercivity to receive the write data.

The data may be written to the selected write spot using a write signal based on an optimal value of a write signal parameter at a room temperature.

The coercivity distribution of the data storage medium may be classified into a plurality of coercivity distribution classes according to a strength of a coercivity, the ambient temperature may be classified into a plurality of ambient temperature classes according to a magnitude of the ambient temperature, and data may be written to one of a plurality of write spots belonging to one of a plurality of coercivity distribution classes corresponding to one of the plurality of ambient temperature classes to which the measured ambient temperature belongs, wherein a number of the plurality of coercivity distribution classes is equal to a number of the plurality of ambient temperature classes.

The mapping of the coercivity distribution of the data storage medium may include searching for an optimal value of a write signal parameter at the room temperature, setting a reference parameter value smaller than the optimal value, writing test data to each of the plurality of write spots of the data storage medium using a write signal based on the reference parameter value, and reading the test data written to each of the plurality of write spots to determine a write spot in which an error occurs corresponding to a write spot having a relatively large coercivity and a write spot in which an error does not occur as another write spot having a relatively small coercivity.

The write signal parameter may include at least one of a write current (WC), an overshoot amplitude (OSA), and an overshoot duration (OSD).

The optimal value of the write signal parameter may be a value of a write signal parameter at which a bit error rate (BER) or a channel statistic measurement (CSM) is at a minimum value thereof.

A plurality of reference parameter values having different magnitudes may be set, and the coercivity of the data storage medium may be classified into a plurality of classes, wherein a number of the plurality of classes of the coercivity is one larger than a number of the plurality of reference parameter values.

The foregoing and/or other aspects and utilities of the present general inventive concept may also be achieved by providing a method of mapping a coercivity distribution of a recording medium, the method including identifying an optimal value of a write signal parameter at a predetermined temperature, setting a reference parameter value having a value less than the optimal value, writing test data to a plurality of write spots of the recording medium using a write signal based on the reference parameter, reading the test data from the plurality of write spots, determining whether a read error occurs for each of the plurality of write spots based on the test data read and determining a coercivity based on the determination of whether the read error occurs for each of the plurality of write spots.

The foregoing and/or other aspects and utilities of the present general inventive concept may also be achieved by providing method of writing data to a data storage medium having a plurality of write spots, the method including identifying an optimal value of a write signal parameter at a predetermined temperature, measuring a current ambient temperature, and determining whether the measured ambient temperature is equal to the predetermined temperature by, randomly selecting the plurality of write spots to receive write data when the measured ambient temperature is equal to the predetermined temperature, and determining whether the measured ambient temperature is higher or lower than the predetermined temperature when the measured ambient temperature is not equal to the predetermined temperature, and writing the data to at least one of the plurality of write spots corresponding to the determination of whether the measured ambient temperature is higher or lower than the predetermined temperature operation.

The foregoing and/or other aspects and utilities of the present general inventive concept may also be achieved by providing a method of mapping a coercivity distribution of a recording medium, the method including identifying an optimal value of a write signal parameter at a predetermined temperature, setting a first reference parameter value having a value less than the optimal value, writing first test data to a first set of write spots of the recording medium using a write signal based on the first reference parameter value, reading the first test data from the first set of write spots, determining whether a read error occurs for each of the plurality of write spots based on the first test data read and determining a coercivity distribution class based on the determination of whether the read error occurs for each of the first set of write spots by, determining that each of the first set of write spots for which the read error occurs corresponds to a first coercivity distribution class, and setting a second reference parameter value having a value less than the first reference parameter value for each of the first set of write spots in which the read error does not occur.

The foregoing and/or other aspects and utilities of the present general inventive concept may also be achieved by providing computer readable recording medium containing computer readable codes to perform a method of writing data using a coercivity distribution of a data storage medium, the method including mapping the coercivity distribution of the data storage medium including a plurality of write spots in which data can be written, measuring a current ambient temperature, and if the ambient temperature is higher than a room temperature, selecting one of the plurality of write spots having a relatively large coercivity to receive write data, and if the ambient temperature is lower than the room temperature, selecting another of the plurality of write spots having a relatively small coercivity to receive the write data.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
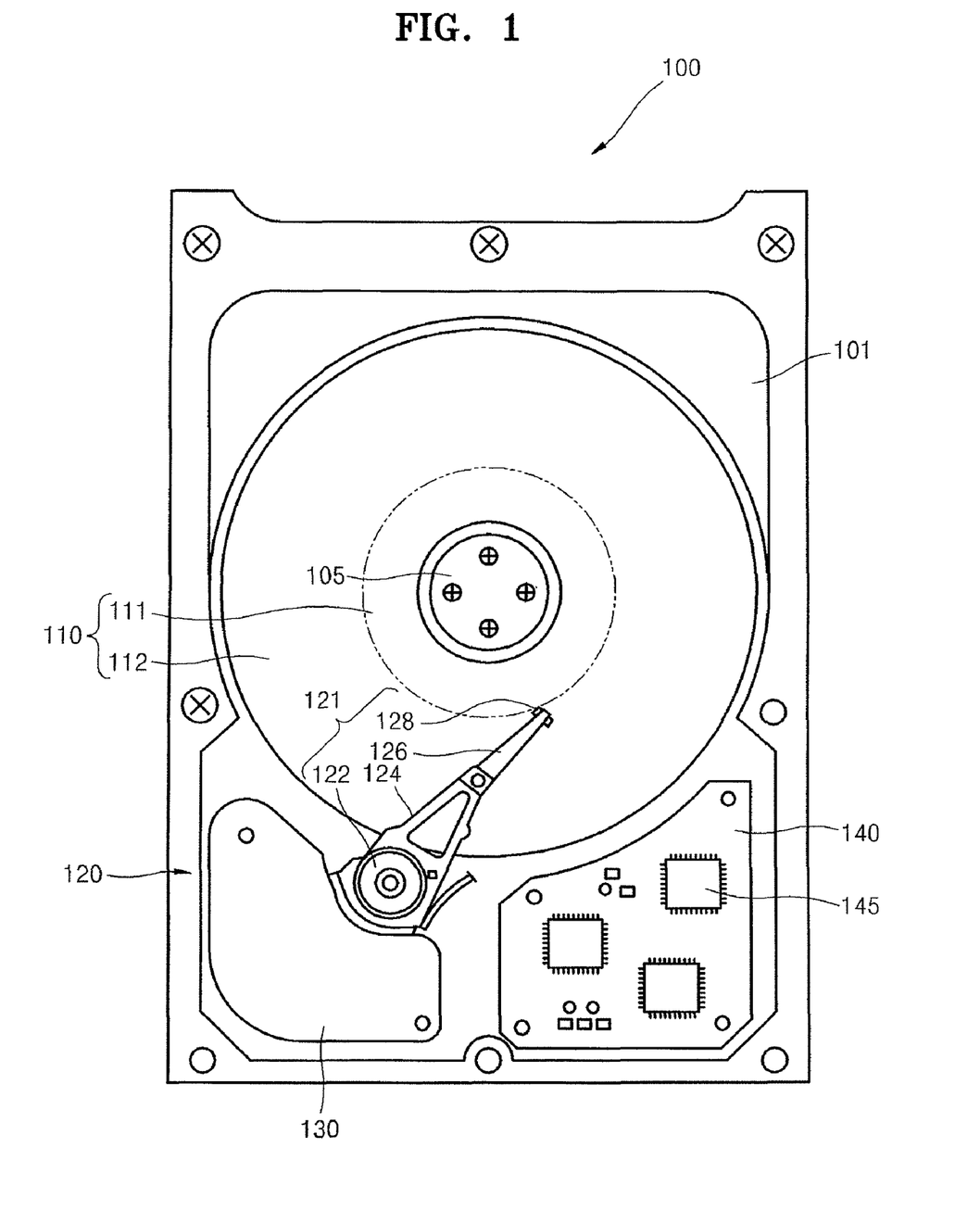
FIG. 1 is a plan view of a hard disk drive according to an embodiment of the present general inventive concept.

Referring to FIG. 1, a hard disk drive 100 includes a base member 101, a spindle motor 105 installed inside a housing formed of a cover member (not illustrated) combined with the base member 101, a disk 110 as a data storage medium, and an actuator 120.

The spindle motor 105 rotates the disk 110 and is fixedly installed at the base member 101. The disk 110 is combined with the spindle motor 105 to rotate at a high speed and includes a parking area 111 in which a head slider 128 of a front part of a head stack assembly (HSA) 121 is parked when the hard disk drive is an inactive state, such as when an operation of the hard disk drive 100 stops, and a data area 112 in which data is stored.

Figure 2:
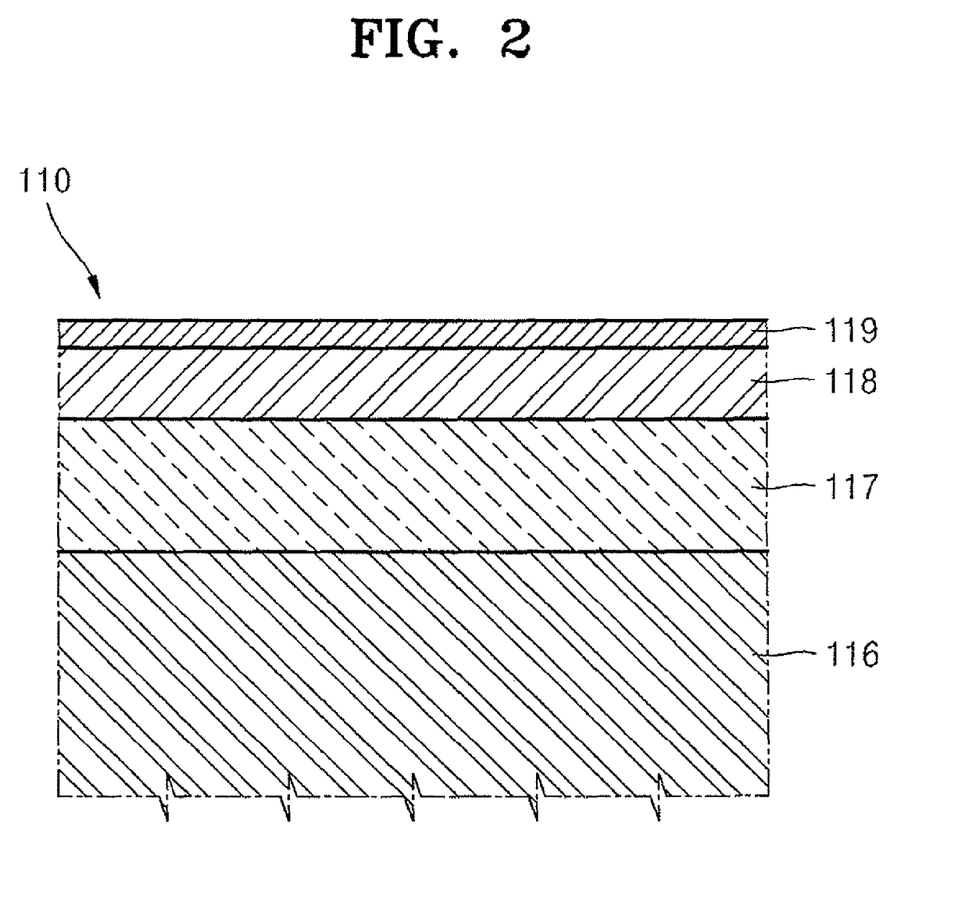
FIG. 2 is a cross-sectional view of a disk as a data storage medium according to an embodiment of the present general inventive concept.

Referring to FIG. 2, the disk 110 as the data storage medium includes a substrate 116 formed of glass or aluminum, a magnetic layer 117, a protective layer 118, and a lubricant layer 119 which are sequentially stacked on the substrate 116. The magnetic layer 117 is a layer on which data is written using a magnetic anisotropic characteristic. The protective layer 118 protects the magnetic layer 117 and prevents the magnetic layer 117 from being oxidized. The lubricant layer 119 prevents the disk 110 and a magnetic head from being damaged due to contact with the head slider 128 illustrated in FIG. 1.

Referring back to FIG. 1, the actuator 120 includes the HSA 121 and a voice coil motor 130. The HSA 121 mounts the head slider 128 at its front end and is pivotably installed on the base member 101. The voice coil motor 130 provides a rotation force to rotate the HSA 121.

The HSA 121 includes a swing arm 124 which includes a pivot bearing 122 and is pivotably installed on the base member 101, a suspension 126 which is combined with a front end of the swing arm 124, and the head slider 128 which is mounted at a front end of the suspension 126. The magnetic head (not illustrated) is formed at the head slider 128 to write data to the disk 110 and/or read data from the disk 110.

If the disk 110 rotates at a high speed, a lift acts on the head slider 128. The head slider 128 floats at a height at which the lift balances the elastic pressure of the suspension 126, which presses the head slider 128 toward the disk 110. In this floating state, the magnetic head writes data to a specific track of the disk 110 or reads data from the specific track of the disk 110.

Referring to FIG. 1, the voice coil motor 130 includes a voice coil (not illustrated), magnets (not illustrated), and yokes (not illustrated). The voice coil 130 is provided on, for example, a protrusion (not illustrated) protruding toward the suspension 126 based on the pivot bearing 122. The magnets are disposed above and under the voice coil 130. The yokes support the magnets. The HSA 121 pivots toward a direction complying with the Fleming's left hand rule due to an interaction between a current signal input to the voice coil 130 and a magnetic field formed by the magnets.

The spindle motor 105, the magnetic head of the head slider 128, and the voice coil of the voice coil motor 130 are connected to electronic circuits 145 mounted on a printed circuit board (PCB) 140.

The electronic circuits 145 operate as controllers controlling the spindle motor 105, the magnetic head of the head slider 128, and the voice coil motor 130.

A method of writing data using a coercivity distribution of a data storage medium according to an embodiment of the present general inventive concept will now be described below in detail.

Figure 3:
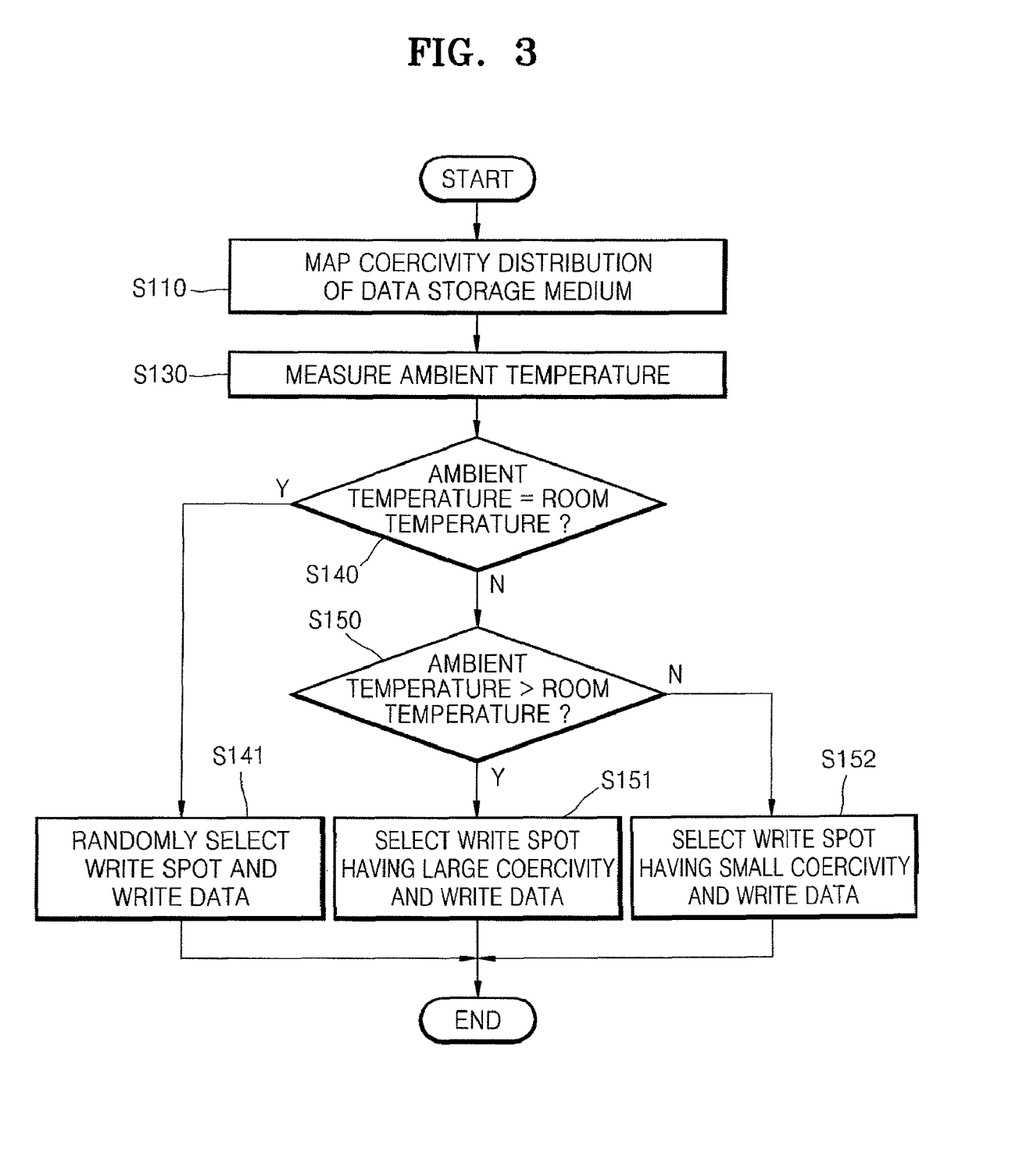
FIG. 3 is a flowchart of a method of writing data using a coercivity distribution of a data storage medium according to an embodiment of the present general inventive concept.
Figure 4:
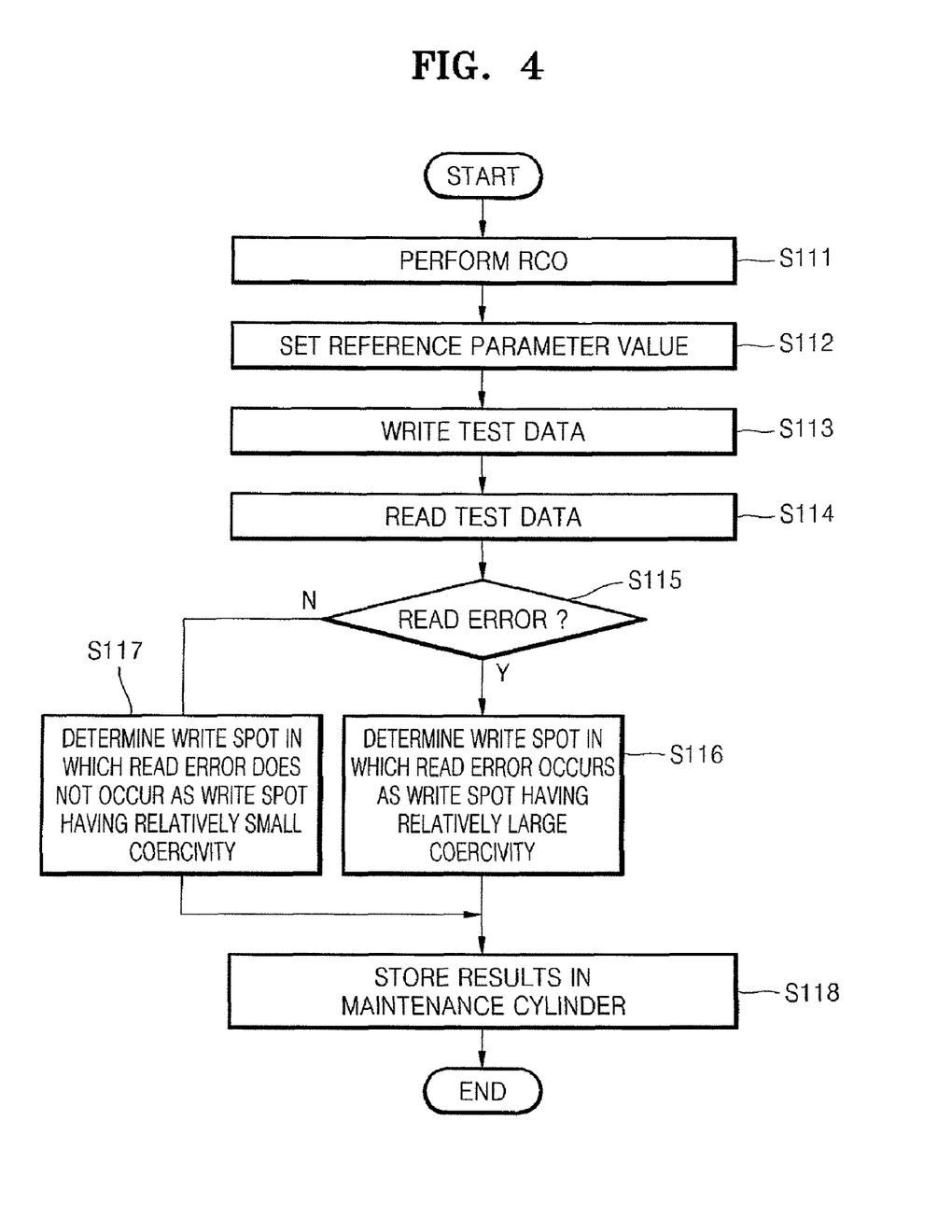
FIG. 4 is a flowchart of a method of mapping the coercivity distribution of the data storage medium illustrated in FIG. 3 according to an embodiment of the present general inventive concept.
Figure 5:
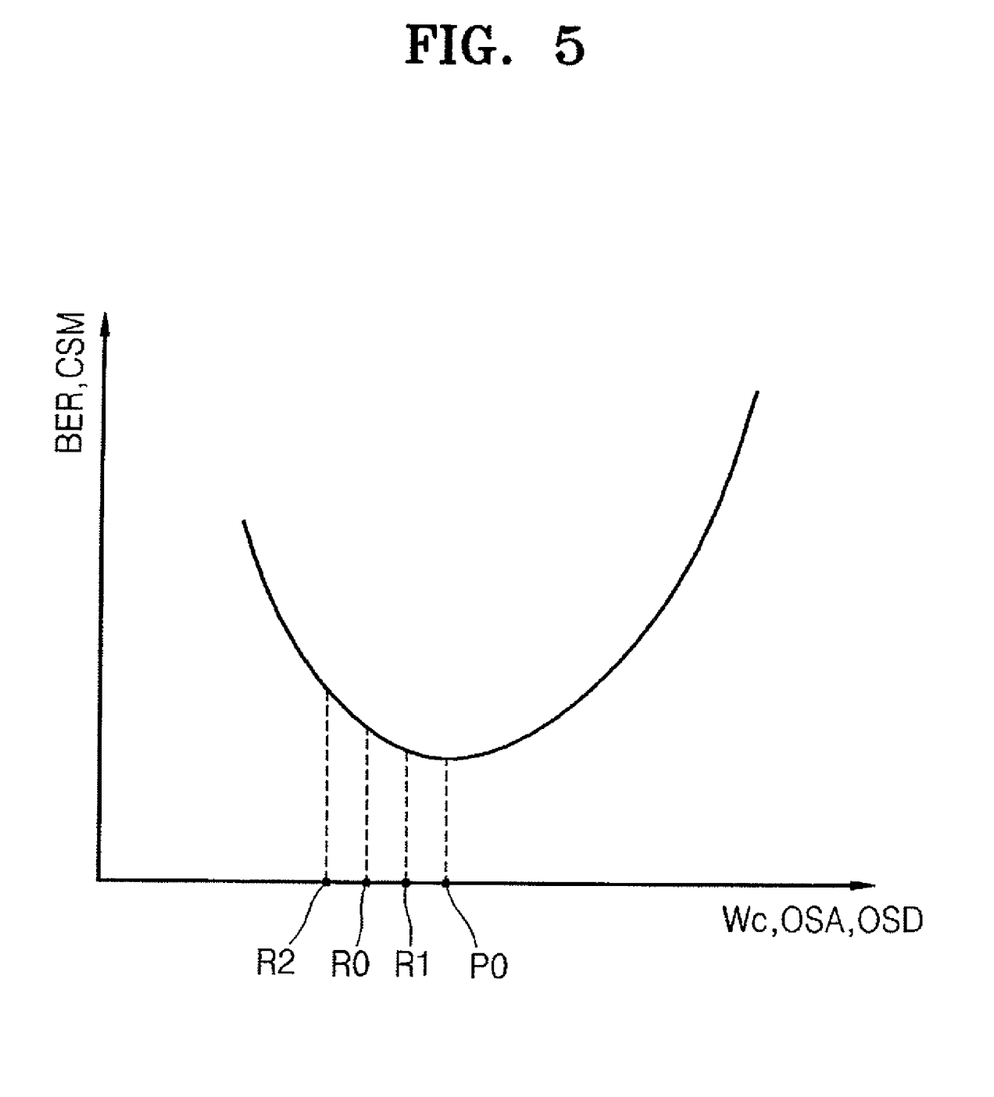
FIG. 5 is a graph illustrating a method of mapping a coercivity distribution of a data storage medium according to an embodiment of the present general inventive concept.

FIG. 3 is a flowchart of a method of writing data using a coercivity distribution of a data storage medium according to an embodiment of the present general inventive concept, FIG. 4 is a flowchart of a method of mapping the coercivity distribution of the data storage medium illustrated in FIG. 3, according to an embodiment of the present general inventive concept, and FIG. 5 is a graph illustrating the method of mapping the coercivity distribution of the data storage medium.

Referring to FIGS. 3 and 4, in operation S110, a coercivity distribution of a data storage medium, i.e., the disk 110 illustrated in FIG. 1, is mapped. Write spots of the data area 112 of the disk 110 may have different coercivities within an allowance range due to a method of stacking the magnetic layer 117, the protective layer 118, and the lubricant layer 119 in the manufacturing process of the disk 110, minute differences in constituents and thicknesses of the magnetic layer 117, the protective layer 118, and the lubricant layer 119, etc. Thus, coercivity distribution is formed on the disk 110. Since it is difficult to design the coercivity distribution of the disk 110 in the manufacturing process of the disk 110, the coercivity distribution of the disk 110 is mapped after the disk 110 has been manufactured.

In operation S111, as illustrated in FIG. 4, a read channel optimization (RCO) is performed to search for an optimal value of a write signal parameter at a room temperature so as to map the coercivity distribution of the disk 110. The RCO is performed in a burn-in test to search for an optimal value of a parameter applied to write data to the disk 110 or an optimal value of a parameter applied to read data from the disk 110. The write signal parameter applied to write data includes a write current (WC), an overshoot amplitude (OSA), an overshoot duration (OSD), etc.

As illustrated in FIG. 5, the BER and/or the CSM are decreased and then increased. Thus, an optimal value P0 of the write signal parameter may be searched in operation S111 (FIG. 4), wherein the BER and/or the CSM is at its minimum value at the optimal value P0 through sweeping of the write signal parameter at a room temperature. The write signal parameter used to map the coercivity distribution includes at least one of the WC, the OSA, and the OSD. Also, an optimal value of the write signal parameter may be searched using a graph illustrating the result of the BER or a graph illustrating the result of the CSM.

Referring to FIGS. 1, 4 and 5, in operation S112, a reference parameter value R0 smaller than the optimal value P0 is set. Whether the reference parameter value R0 is appropriate is determined by results. For example, if the BER or the CSM is improved when the reference parameter R0 is set to a predetermined value and data is written to the disk 110 using the method of writing data according to the present general inventive concept, it is determined that the reference parameter value R0 is appropriate.

In operation S113, test data is written to write spots of the disk 110 using a write signal based on the reference parameter value R0. Accordingly, constituents of a specific parameter (e.g., WC, OSA, OSC, etc.) which are inherent to and impact the reference parameter value R0 are included in the write signal that is input to the magnetic head. In an embodiment of the present general inventive concept, the write spots may be bit cells of the data area 112 of the disk 110.

In operation S114, the test data written to the write spots are read. In operation S115, a determination is made as to whether a read error occurs in each of the write spots. Since the reference parameter value R0 is smaller than the optimal value P0, the read error occurring in operation S114 may be caused by a weak write rather than by ATW (or ATE). In operation S116, the write spot in which the read error occurs is determined as a write spot having a relatively large coercivity. In operation S117, the write spot in which the read error does not occur is determined as a write spot having a relatively small coercivity. In operation S118, the results of classifying the write spots according to the strengths of the coercivities of the write spot are stored, for example, in a maintenance cylinder (not illustrated), wherein important information necessary to drive the hard disk drive 100 is stored in the maintenance cylinder.

Referring to FIGS. 1 and 3, in operation S130, a current ambient temperature is measured to write data using the coercivity distribution of the disk 110 obtained using the above-described method. In operation S140, a determination is made as to whether the measured ambient temperature is equal to a room temperature. The room temperature in operation S111 (FIG. 4) and the room temperature in operation S140 must be set to the same temperature, generally, 30° C.

If the measured ambient temperature is equal to the room temperature, the write spots of the disk 110 are randomly selected to receive write data in operation S141. If the measured ambient temperature is not equal to the room temperature, a determination is made as to whether ambient temperature is higher than the room temperature. If the ambient temperature is higher than the room temperature, it is expected that the strength of the coercivity may be reduced due to a rise in a temperature of the disk 110. Thus, the write spot is selected to write data in operation S151, wherein the write spot is determined to have the relatively large coercivity in operation S110 (FIG. 4). If the ambient temperature is lower than the room temperature, it is expected that the strength of the coercivity may be increased due to a drop in the temperature of the disk 110. Thus, the write spot is selected to write data in operation S152, wherein the write spot is determined to have the relatively small coercivity in operation S110 (FIG. 4).

In an embodiment of the present general inventive concept, the magnetic head moves onto the selected write spot, and the write signal is input to the magnetic head to write data to form a write magnetic field so as to write data. Data is written using the write signal based on the optimal value P0 of the write signal parameter at the room temperature in operations S141, S151, and S152 illustrated in FIG. 3. Accordingly, the write signal based on the optimal value P0 of the write signal parameter indicates that the constituents of the specific parameter (e.g., WC, OSA, OSD, etc.) which are inherent to and impact the optimal value P0 of the write signal parameter are included in the write signal.

Figure 6:
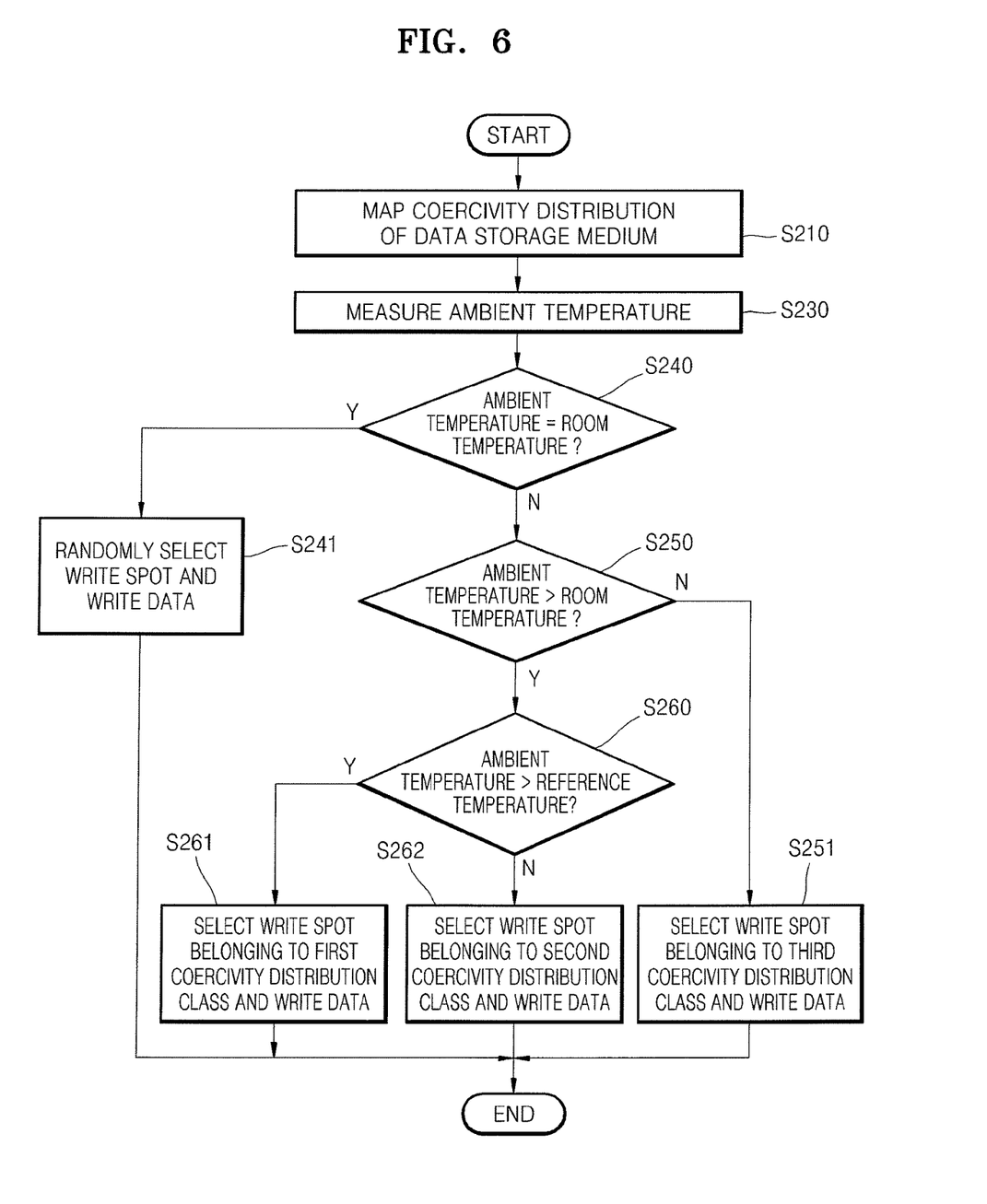
FIG. 6 is a flowchart of a method of writing data using a coercivity distribution of a data storage medium according to another embodiment of the present general inventive concept.
Figure 7:
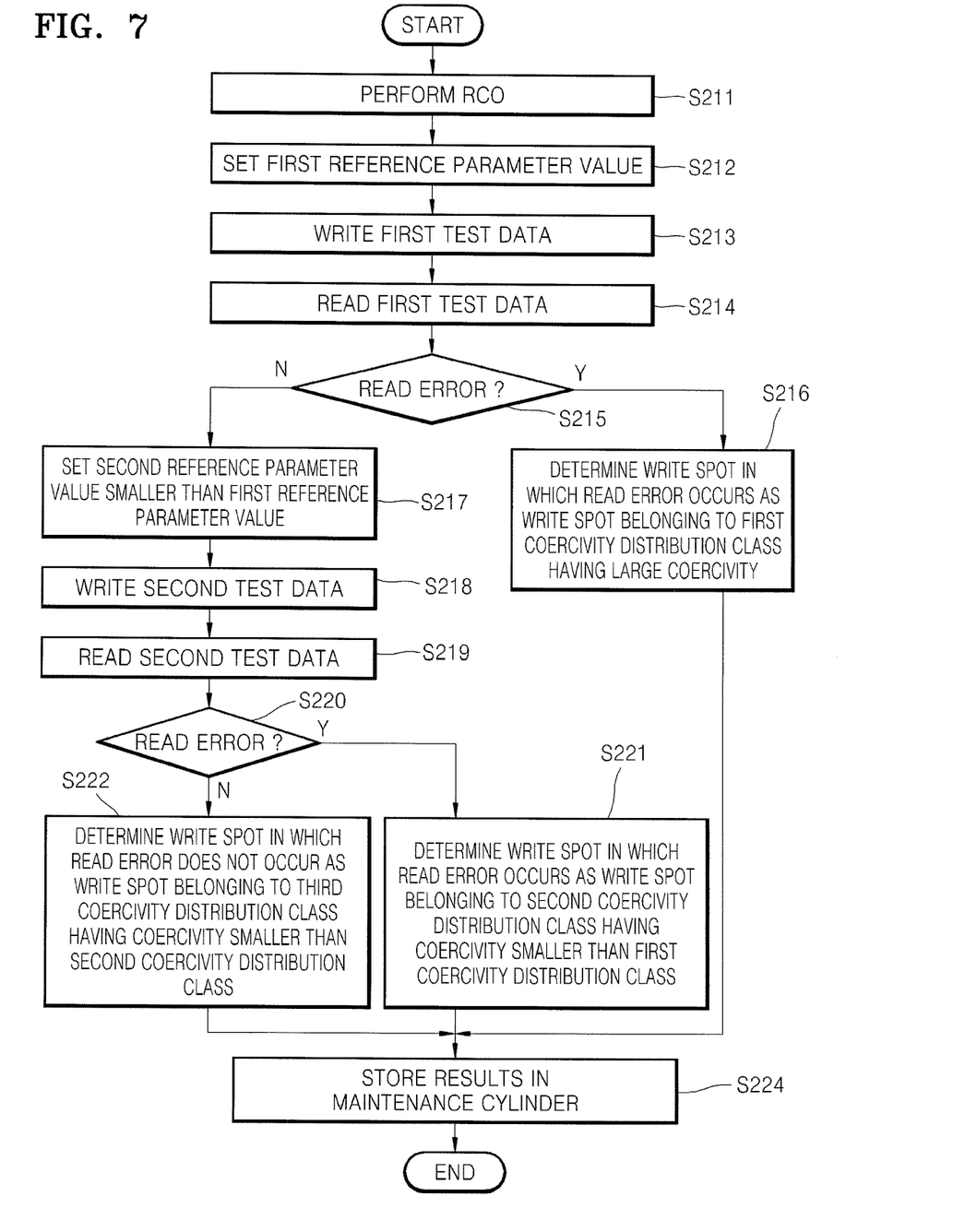
FIG. 7 is a flowchart of a method of mapping the coercivity distribution of the data storage medium illustrated in FIG. 6 according to an embodiment of the present general inventive concept.

In the method of writing the data according to an embodiment of the present general inventive concept, the coercivity distribution of the disk 110 is classified into two classes, and the ambient temperature is classified into two classes based on the room temperature. However, in another embodiment of the present general present inventive concept, the coercivity distribution of the disk 110 may be classified into three or more classes, and the ambient temperature may be classified into three or more classes. With reference to FIGS. 6 and 7, each of a coercivity distribution and an ambient temperature will be classified into three classes.

FIG. 6 is a flowchart illustrating a method of writing data using a coercivity distribution of a data storage medium according to another embodiment of the present general inventive concept, and FIG. 7 is a flowchart illustrating a method of mapping the coercivity distribution of the data storage medium illustrated in FIG. 6. Referring to FIGS. 6 and 7, in operation S210, a coercivity distribution of a data storage medium, i.e., the disk 110 illustrated in FIG. 1, is mapped. In operation S211, an RCO is performed to search for an optimal value of a write signal parameter at a room temperature to map the coercivity distribution of the disk 110.

As described in the previous embodiment, the write signal parameter includes a WC, an OSA, an OSD, etc. Also, an optimal value P0 of the write signal parameter may be searched through sweeping of the write signal parameter at the room temperature, for example, as illustrated in FIG. 5, in operation S211, wherein a BER or a CSM is minimum at the optimal value P0.

Referring to FIGS. 1, 5 and 7, in operation S212, a first reference parameter value R1 (FIG. 5) smaller than the optimal value P0 is set. In operation S213, first test data is written to each write spot of the disk 110 using a write signal based on the first reference parameter R1. In operation S214, the first test data written to each write spot is read. In operation S215, a determination is made as to whether a read error occurs in each write spot. In operation S216, a write spot in which the read error occurs is determined as a write spot belonging to a first coercivity distribution class having a large coercivity.

In operation S217, a second reference parameter value R2 smaller than the first reference parameter value R1 is set for a write spot in which the read error does not occur. In operation S218, second test data is written using a write signal based on the second reference parameter value R2. In operation S219, the second test data is read. In operation S220, a determination is made as to whether a read error occurs. In operation S221, the write spot in which the error occurs is determined as a write spot belonging to a second coercivity distribution class having a coercivity smaller than the first coercivity distribution class. In operation S222, the write spot in which the read error does not occur is determined as a write spot belonging to a third coercivity distribution class smaller than the second coercivity distribution class. The first and second reference parameter values R1 and R2 are determined by results similarly to the reference parameter R0 in the previous embodiment.

In operation S224, the results of classifying a coercivity distribution into the first, second, and third coercivity distribution classes according to each write spot of the disk 110 are stored, for example, in a maintenance cylinder (not illustrated). In another embodiment of the present general inventive concept, three or more reference parameters may be set. Accordingly, a coercivity distribution of a disk may be classified into a number of classes, wherein the number of classes is one more than the number of the reference parameters.

Referring to FIGS. 1 and 6, in operation S230, a current ambient temperature is measured to write data using the coercivity distribution of the disk 110. In operation S240, a determination is made as to whether the measured ambient temperature is equal to a room temperature. The room temperature in operation S211 (FIG. 7) and the room temperature in operation S240 must be set to the same temperature, generally, 30° C.

If the measured ambient temperature is equal to the room temperature, write spots of the disk 110 are randomly selected to receive write data in operation S241. If the measured ambient temperature is not equal to the room temperature, a determination is made as to whether the ambient temperature is higher than the room temperature in operation S250. If the ambient temperature is higher than the room temperature, a determination is made as to whether the ambient temperature is higher than a reference temperature set up to a value higher than the room temperature in operation S260.

If the ambient temperature is higher than the reference temperature, it is expected that an increase in the temperature of the disk 110 is relatively large, and thus a strength of a coercivity is considerably reduced. Thus, a write spot belonging to a first coercivity distribution class is selected to write data in operation S261, wherein the strength of the coercivity of the first coercivity distribution class is the largest among those of the three coercivity distribution classes. If the ambient temperature is not higher than the reference temperature, it is expected that the increase in the temperature of the disk 110 is relatively small, and thus the strength of the coercivity is slightly reduced. Thus, a write spot belonging to a second coercivity distribution class is selected to receive write data in operation S262, wherein the strength of the coercivity of the second coercivity distribution class is smaller than that of the first coercivity distribution class. If it is determined in operation S250 that the ambient temperature is lower than the room temperature, it is expected that the strength of the coercivity is increased due to a drop in the temperature of the disk 110. Thus, a write spot belonging to a third coercivity distribution class is selected to receive write data in operation S251, wherein the strength of the coericivity of the third coercivity distribution class is the smallest among those of the three coercivity distribution classes.

In an embodiment of the present general inventive concept, data is written using the write signal based on the optimal value P0 of the write signal parameter at the room temperature in operation S241, S251, S261, and S262. The write signal based on the optimal value P0 of the write signal parameter indicates that constituents of a specific parameter (e.g., WC, OSA, OSD, etc.) which are inherent to and impact the optimal value P0 of the write signal parameter are included in the write signal.

As described above, in a method of writing data using a coercivity distribution of a data storage medium, data can be written to an optimal write spot depending on a variation in an ambient temperature. Thus, reliability of writing of data can be improved.

Also, although data is written to the data storage medium using a write signal optimized at a room temperature, the reliability of writing data cannot be deteriorated.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of writing data using a coercivity distribution of a data storage medium, comprising:
    mapping the coercivity distribution of the data storage medium including a plurality of write spots to which data can be written;
    measuring a current ambient temperature; and
    if the ambient temperature is higher than a room temperature, selecting one of the plurality of write spots having a relatively large coercivity to receive write data, and if the ambient temperature is lower than the room temperature, selecting another of the plurality of write spots having a relatively small coercivity to receive the write data.

2. The method of claim 1, wherein the data is written to the selected write spot using a write signal based on an optimal value of a write signal parameter at a room temperature.

3. The method of claim 1, wherein the coercivity distribution of the data storage medium is classified into a plurality of coercivity distribution classes according to a strength of a coercivity, the ambient temperature is classified into a plurality of ambient temperature classes according to a magnitude of the ambient temperature, and data is written to one of a plurality of write spots belonging to one of a plurality of coercivity distribution classes corresponding to one of a plurality of ambient temperature classes to which the measured ambient temperature belongs, wherein the number of the plurality of coercivity distribution classes is equal to the number of the plurality of ambient temperature classes.

4. The method of claim 1, wherein the mapping of the coercivity distribution of the data storage medium comprises:
    searching for an optimal value of a write signal parameter at the room temperature;
    setting a reference parameter value smaller than the optimal value;
    writing test data to each of the plurality of write spots of the data storage medium using a write signal based on the reference parameter value; and
    reading the test data written to each of the plurality of write spots to determine a write spot in which an error occurs as a write spot having a relatively large coercivity and a write spot in which an error does not occur as another write spot having a relatively small coercivity.

5. The method of claim 4, wherein the write signal parameter comprises at least one of a WC (write current), an OSA (overshoot amplitude), and an OSD (overshoot duration).

6. The method of claim 4, wherein the optimal value of the write signal parameter is a value of a write signal parameter at which a BER (bit error rate) or a CSM (channel statistic measurement) is of a minimum value thereof.

7. The method of claim 4, wherein a plurality of reference parameter values having different magnitudes are set, and the coercivity distribution of the data storage medium is classified into a plurality of classes, wherein a number of the plurality of classes of the coercivity distribution is one more than a number of the plurality of reference parameter values.

8. A method of mapping a coercivity distribution of a recording medium, the method comprising:
    identifying an optimal value of a write signal parameter at a predetermined temperature;
    setting a reference parameter value having a value less than the optimal value;
    writing test data to a plurality of write spots of the recording medium using a write signal based on the reference parameter;
    reading the test data from the plurality of write spots;
    determining whether a read error occurs for each of the plurality of write spots based on the test data read; and
    determining a coercivity based on the determination of whether the read error occurs for each of the plurality of write spots.

9. The method of claim 8, wherein the determining whether the read error occurs for each of the plurality of write spots comprises:
    determining that each of the plurality of write spots have a relatively large coercivity for which the read error occurs, and
    determining that each of the plurality of write spots have a relatively small coercivity for which the read error does not occur.

10. The method of claim 9, further comprising:
    storing the determination results of whether each of the plurality of write spots have the relatively large coercivity or the relatively small coercivity.

11. A method of writing data to a data storage medium having a plurality of write spots, the method comprising:
    identifying an optimal value of a write signal parameter at a predetermined temperature;
    measuring a current ambient temperature;
    determining whether the measured ambient temperature is equal to the predetermined temperature by,
        randomly selecting the plurality of write spots to receive write data when the measured ambient temperature is equal to the predetermined temperature, and
        determining whether the measured ambient temperature is higher or lower than the predetermined temperature when the measured ambient temperature is not equal to the predetermined temperature; and
    writing the data to at least one of the plurality of write spots corresponding to the determination of whether the measured ambient temperature is higher or lower than the predetermined temperature operation.

12. The method according to claim 11, wherein the determining whether the measured ambient temperature is higher or lower than the predetermined temperature operation comprises:
    selecting a write spot corresponding to a third coercivity distribution class to receive write data when the measured ambient temperature is lower than the predetermined temperature; and
    determining whether the ambient temperature is higher than a predetermined reference temperature having a value higher than the predetermined temperature when the measured ambient temperature is higher or lower than the predetermined temperature.

13. The method according to claim 12, wherein the determining whether the ambient temperature is higher than a predetermined reference temperature operation comprises:
    selecting a write spot corresponding to a second coercivity distribution class to receive the write data when the measured ambient temperature is not greater than the predetermined reference temperature, and selecting a write spot corresponding to a first coercivity distribution class to receive the write data when the measured ambient temperature is greater than the predetermined reference temperature.

14. The method according to claim 13, wherein coercivity of write spots corresponding to the third coercivity distribution class is less than coercivity of write spots corresponding to the second coercivity distribution class.

15. The method according to claim 14, wherein the coercivity of the write spots corresponding to the second coercivity distribution class is less than coercivity of the write spots corresponding to the first coercivity distribution class.

16. A method of mapping a coercivity distribution of a recording medium, the method comprising:

identifying an optimal value of a write signal parameter at a predetermined temperature;

setting a first reference parameter value having a value less than the optimal value;

writing first test data to a first set of write spots of the recording medium using a write signal based on the first reference parameter value;

reading the first test data from the first set of write spots;

determining whether a read error occurs for each of the plurality of write spots based on the first test data read; and determining a coercivity distribution class based on the determination of whether the read error occurs for each of the first set of write spots by, determining that each of the first set of write spots for which the read error occurs corresponds to a first coercivity distribution class, and setting a second reference parameter value having a value less than the first reference parameter value for each of the first set of write spots in which the read error does not occur.

17. The method according to claim 16, further comprising:

writing second test data to a second set of write spots not corresponding with the first coercivity distribution class using a write signal based on the second reference parameter value;

reading the second test data from the second set of write spots; and determining whether a second reference parameter read error occurs for each of the second set of write spots.

18. The method according to claim 17, wherein the determining whether the second reference parameter read error occurs operation comprises:

determining that each of the second set of write spots for which the second reference parameter read error occurs corresponds to a second coercivity distribution class, and determining that each of the second set of write spots for which the second reference parameter read error does not occur corresponds to a third coercivity distribution class.

19. The method of claim 18, further comprising:

storing the determination results of whether each of the first and second set of write spots have the relatively large coercivity or the relatively small coercivity.

20. The method according to claim 19, wherein the coercivity of write spots corresponding to the third coercivity distribution class is less than the coercivity of write spots corresponding to the second coercivity distribution class.

21. The method according to claim 20, wherein the coercivity of write spots corresponding to the second coercivity distribution class is less than the coercivity of write spots corresponding to the first coercivity distribution class.

22. A non-transitory computer readable recording medium containing computer readable codes to perform a method of writing data using a coercivity distribution of a data storage medium, the method comprising:

mapping the coercivity distribution of the data storage medium including a plurality of write spots in which data can be written;

measuring a current ambient temperature; and if the ambient temperature is higher than a room temperature, selecting one of the plurality of write spots having a relatively large coercivity to receive write data, and if the ambient temperature is lower than the room temperature, selecting another of the plurality of write spots having a relatively small coercivity to receive the write data.

23. A method of writing data using a coercivity distribution of a data storage medium, comprising:

determining whether a measured ambient temperature is greater than a predetermined temperature;

and selecting one of a plurality of write spots having a coercivity value greater than a predetermined value to receive write data when the measured ambient temperature is determined to be greater than the predetermined temperature.

24. The method of claim 23, further comprising:

selecting another of the plurality of write spots having a coercivity value that is less than the predetermined value to receive the write data when the measured ambient temperature is determined to be less than the predetermined temperature.

25. The method of claim 23, further comprising:

randomly selecting a one of the plurality of write spots to receive write data when the measured ambient temperature is determined to be equal to than the predetermined temperature.

* * * * *